Inventor
Joseph Zubaty

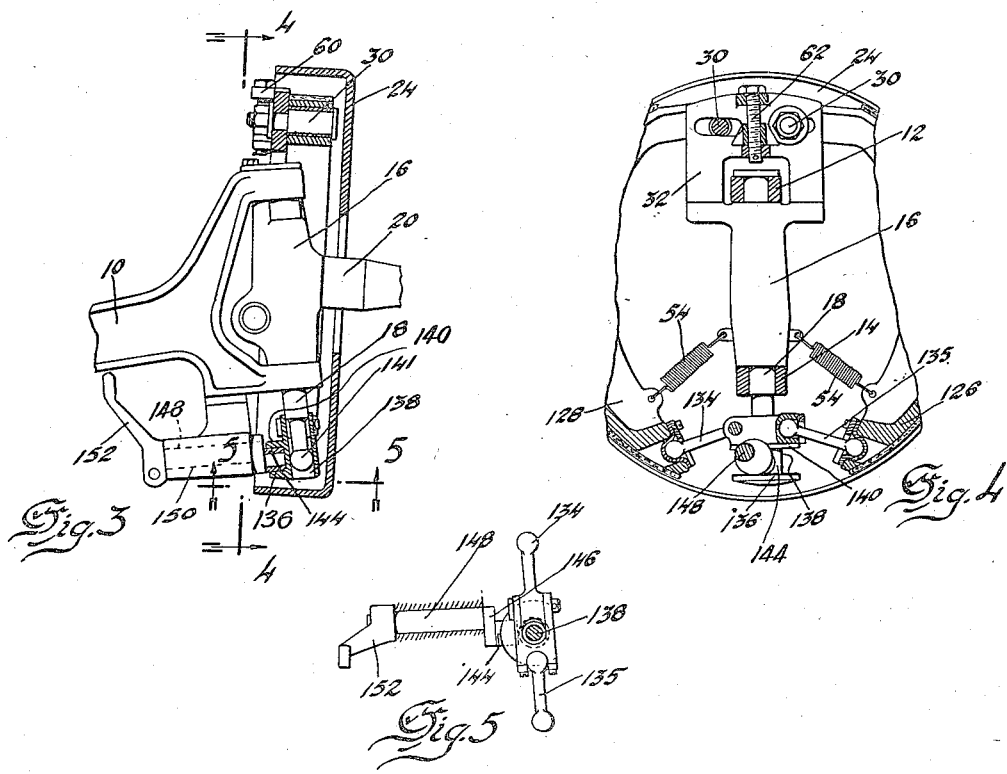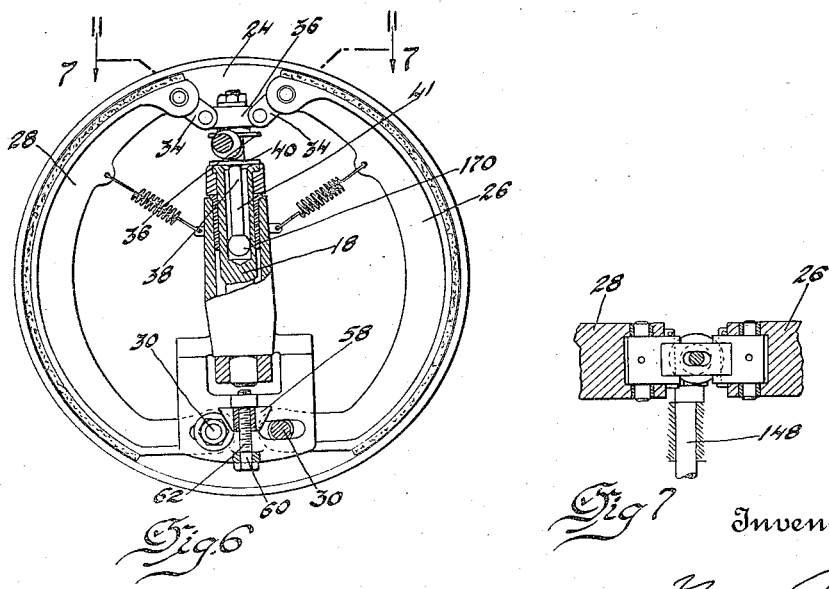

Patented Nov. 8, 1927.

1,648,290

UNITED STATES PATENT OFFICE.

JOSEPH ZUBATY, OF FLINT, MICHIGAN.

BRAKE.

Application filed November 1, 1923. Serial No. 672,193.

This invention relates to brakes, and is illustrated as embodied in a motor vehicle having brakes of novel form on its front wheels.

Objects of the invention are to provide simple operating connections for the brakes which are not affected by steering movement of the wheels, and also to provide a simple adjustment to vary the clearance between the brake shoes and the drum to take up for wear.

Having in view the first of these objects, the invention contemplates controlling the brake band supported by the front wheel knuckle by means of a plunger, which is preferably connected to the band by means of a toggle, and which is swiveled to an operating device to prevent swiveling of the knuckle from having any effect on the operation of the brake. In one desirable arrangement, this plunger, which of course will usually be arranged for movement along the swiveling axis of the knuckle, has a pair of spaced flanges between which a driver-controlled operating device, such as an eccentric part operated by a rock shaft shown as supported on the front axle, is received so that the plunger is operated positively both in straightening and in breaking the toggle, thus eliminating reliance on a spring for moving it in one direction.

In order to provide the desired simple adjustment for the brake shoe anchors, a wedge member is arranged between the anchors for the two shoes in such a manner that it may be adjusted manually to force the anchors apart more or less to vary the clearance between the shoes and the drum.

The above and other objects and features of the invention, including various novel combinations of parts and desirable particular constructions, will be apparent from the following description of several illustrative embodiments shown in the accompanying drawings, in which Fig. 1 is a vertical section through a front wheel having a brake such as described and showing part of the front axle in rear elevation;

Fig. 3 is a view corresponding to part of Fig. 1 showing in vertical section a modified form of brake;

Fig. 4 is a side elevation corresponding to Fig. 2 but showing the brake of Fig. 3, the view being substantially on the line 4—4 of Fig. 3;

Fig. 5 is a detail sectional view on the line 5—5 of Fig. 3 showing the brake operating toggle;

Fig. 6 is a view corresponding to Figs. 2 and 4 but showing a further modification of the invention; and Fig. 7 is a section on the line 7—7 of Fig. 6 showing the brake operating means.

Figure 1:
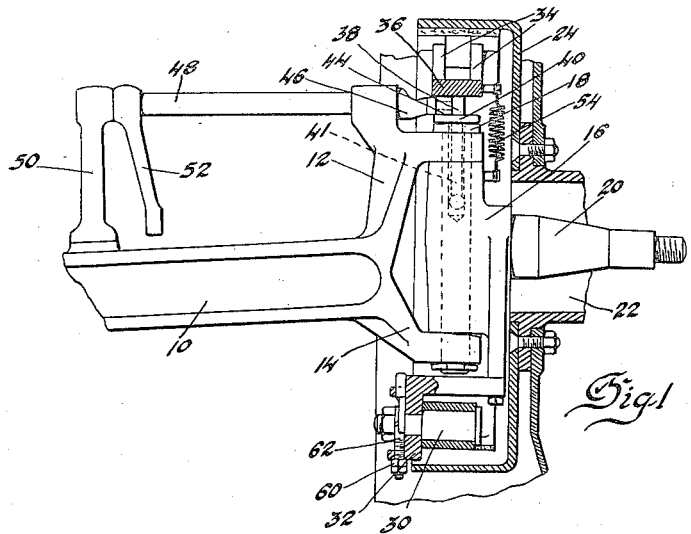
Figure 2:
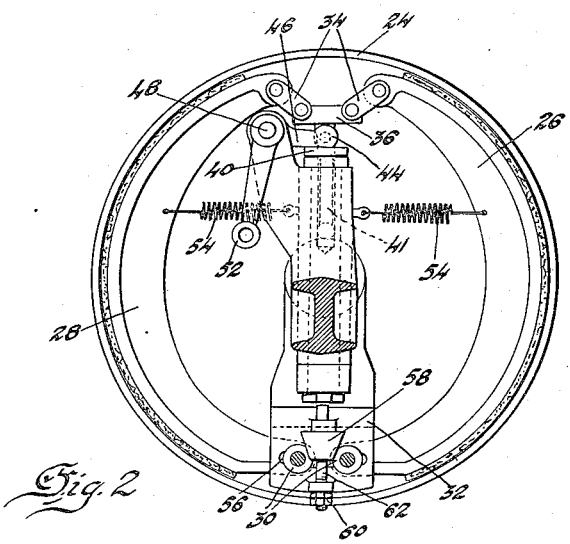
Fig. 2 is a side elevation of the part shown in Fig. 1, looking from the left in Fig. 1, and showing the axle in vertical section.

In the modification shown in Figs. 1 and 2, the invention is embodied in a vehicle having a front axle 10 with arms 12 and 14 embracing a knuckle 16 swiveled between the arms by means of a king pin 18 and having a spindle 20 on which is journaled a front wheel, part of which is shown at 22. The wheel is provided with a brake drum 24 which may be of any desired form. Associated with the drum 24 is a retarding device of any desired character, shown as a pair of shoes 26 and 28 faced with friction material and pivotally mounted on anchoring members 30 supported in a bracket 32 depending from the knuckle 16.

The free ends of the shoes 26 and 28 are connected by toggle links 34 with the head 36 of a plunger 38, the plunger having a stem 41 received in a substantially cylindrical socket in the upper end of the king pin 18. Spaced a short distance from the head 36 on the plunger 38 is a flange 40 providing, with the head 36, a pair of spaced flanges between which is arranged an eccentric portion of an operating device such as a roller 44 carried by an arm 46 on a rock shaft 48 supported in bearings formed on the arm 12 of the axle 10 and in a bracket 50 carried by the axle and having an operating arm 52. It will be seen that manipulation of the arm 52 results in positively moving the plunger 38 along the axis about which the knuckle 16 swivels, that is, about the axis of the king pin 18, both to apply and to release the brake. If desired, suitable return springs 54 may be added to urge the shoes 26 and 28 to their idle position.

In order to provide a simple adjustment for the anchor members 30 of the shoes 26 and 28, these members pass through a slot or slots 56 in the bracket 32 and a wedge 58 is arranged between their inner ends to be adjusted radially of the drum by tightening nuts 60 on an adjusting bolt 62 carrying the wedge, thus manually moving the wedge to force apart to a greater or less extent the anchor members 30 to vary the clearance between the shoes 26 and 28 and the drum 24. This adjustment is principally for the purpose of taking up wear in the facings of the brake shoes, but is also necessary in making the initial adjustment of the various parts of the brake.

In the operation of the modification shown in Figs. 1 and 2, manipulation of the arm 52 rocks the shaft 48 to turn the arm 46 in a direction to lift the plunger 38, thus forcing the toggle links 34 toward a straightened position and forcing the brake shoe into frictional engagement with the drum. On release of the brake pedal, the usual return spring for the pedal, assisted, if desired, by such springs as 54 shown in the drawings, returns the various parts to their idle positions, the roller 44 bearing against the flange 40 to operate positively on the brake.

The modification shown in Figs. 3, 4 and 5 differs from the modification shown in Figs. 1 and 2 in that the operating shaft 148 is arranged below the axle, having a supporting part journaled in a bracket 150 carried by the axle and having an operating arm 152. The shaft 148 is provided with a head or disk 146 having an eccentric pin carrying a roller 144 arranged between flanges 136 and 140 on a plunger 138. The plunger 138 is in the form of a cylindrical sleeve mounted on an extension of the king pin 18 which extension has a substantially spherical head 141 and a reduced portion just above this head to permit a slight movement of the sleeve 138 with respect to its support as it is slid radially up and down on the support by rocking the lever 152. The sleeve 138 has a portion pivoted to a link 134 on one side and forming a ball-and-socket joint with a substantially spherical head of a link 135 on the other side; both of the links 134 and 135 being formed at their opposite ends with spherical heads received in sockets formed in the ends of the brake shoes 126 and 128.

In the operation of this modification of the invention, the rocking arm 152 serves to move the roller 144 received between the flanges 136 and 140 positively to straighten and to break the toggle which applies the brake.

The modification shown in Figs. 6 and 7 differs from that shown in Figs. 1 and 2 in that the operating device received between the flanges 36 and 40 is similar to the device shown in Figs. 3, 4 and 5, except that it is above the axle. That is to say, this device is in the form of a rock shaft 148 provided with an eccentric pin having a roller received between these flanges. As will be apparent from Fig. 6, I prefer to allow a slight circumferential movement of the parts to provide for minor inaccuracies in manufacture and assembly by forming the stem 41 of the plunger 38 with a reduced portion received in the socket in the king pin and with a substantially spherical head 170 which fits snugly within the socket.

While several illustrative embodiments of my invention have been described in detail, it is not my intention to limit its scope to those particular embodiments or otherwise than by the terms of the appended claims.

I claim:

1. A vehicle comprising, in combination, an axle having a knuckle swiveled thereto, a wheel journaled on the knuckle having a brake drum, a brake band and an operating toggle carried by the knuckle, a plunger connected to the toggle for movement along the axis about which the knuckle swivels and which has a pair of flanges, and an operating device between the flanges and movable about a horizontal axis to move the plunger while permitting swiveling movement of the knuckle.

2. A vehicle comprising, in combination, an axle having a knuckle swiveled thereto, a wheel journaled on the knuckle having a brake drum, a brake band and an operating toggle supported by the knuckle, a plunger connected to the toggle for movement along the axis about which the knuckle swivels and which plunger has a pair of spaced flanges, and a driver-controlled eccentric device between the flanges to operate the plunger without being affected by swiveling movement of the knuckle.

3. A vehicle comprising, in combination, an axle having a knuckle swiveled thereto, a wheel journaled on the knuckle and having a brake drum, a brake band and an operating toggle therefor carried by the knuckle, a device connected to the toggle for movement along the axis about which the knuckle swivels and which has a pair of spaced flanges, a shaft arranged to be controlled by the driver and which is supported by the axle, and an eccentric member connected to the shaft and arranged between said flanges for positively breaking and straightening the toggle without being affected by swiveling movement of the knuckle.

4. A vehicle comprising, in combination, an axle having a knuckle swiveled thereto, a wheel journaled on the knuckle having a brake drum, a king pin connecting the axle and knuckle and which has a substantially cylindrical socket in its upper end, a brake band and an operating toggle therefor supported by the knuckle, a plunger connected to the toggle having an enlarged substantially spherical head arranged in the recess in the king pin and which has a stem portion of reduced diameter to permit slight circumferential movements of the brake band, the plunger having a pair of axially spaced flanges above the king pin, and an eccentric between the flanges for moving the plunger for operating the brake without being affected by swiveling movement of the knuckle.

5. A brake comprising, in combination, a drum, a fixed support within the drum slotted along a chord of the drum, a pair of shoes arranged within the drum, a pivotal anchoring bolt for each shoe arranged in the slotted portion of the support, and a manually adjustable wedge between the bolts for forcing them apart more or less in the slotted portion of the support to adjust the clearance between the shoes and the drum.

In testimony whereof I affix my signature.

JOSEPH ZUBATY.